(12) United States Patent
Hernandez

(10) Patent No.: US 11,472,378 B2
(45) Date of Patent: Oct. 18, 2022

(54) VEHICLE BUILT-IN ELECTRIC JACK SYSTEM

(71) Applicant: Jonathan Hernandez, Killeen, TX (US)

(72) Inventor: Jonathan Hernandez, Killeen, TX (US)

(*) Notice: Subject to any disclaimer, the term of this patent is extended or adjusted under 35 U.S.C. 154(b) by 259 days.

(21) Appl. No.: 16/454,390

(22) Filed: Jun. 27, 2019

(65) Prior Publication Data
US 2020/0039477 A1    Feb. 6, 2020

Related U.S. Application Data

(60) Provisional application No. 62/714,849, filed on Aug. 6, 2018.

(51) Int. Cl.
*B60S 9/02*    (2006.01)
*F21V 33/00*    (2006.01)
*F21W 102/00*    (2018.01)

(52) U.S. Cl.
CPC ............ *B60S 9/02* (2013.01); *F21V 33/00* (2013.01); *F21W 2102/00* (2018.01)

(58) Field of Classification Search
CPC ... B60Q 1/326; B60S 9/02; B60S 9/12; F21V 33/00; F21W 2102/00
See application file for complete search history.

(56) References Cited

U.S. PATENT DOCUMENTS

| | | | | |
|---|---|---|---|---|
| 5,931,500 A * | 8/1999 | Dagnese | .................. | B60S 9/12 254/423 |
| 6,142,501 A * | 11/2000 | Fogo | ........................ | B60S 9/02 254/419 |
| 6,991,221 B1 * | 1/2006 | Rodriguez | ............... | B60S 9/12 254/423 |
| 7,063,307 B2 * | 6/2006 | Williams, Sr. | ........... | B60S 9/12 254/423 |
| 7,726,690 B1 * | 6/2010 | James | ...................... | B60S 9/02 280/764.1 |
| 8,919,739 B1 | 12/2014 | Romero et al. | | |
| 9,340,397 B1 * | 5/2016 | Hernandez | ................ | B66F 3/25 |
| 10,960,856 B1 * | 3/2021 | Weddle | .................... | B66F 3/44 |
| 2002/0008231 A1 | 1/2002 | Glovatsky et al. | | |
| 2002/0100901 A1 * | 8/2002 | Topelberg | ................ | B60S 9/12 254/423 |
| 2007/0013537 A1 * | 1/2007 | Jones | ...................... | B60Q 1/52 340/626 |

(Continued)

*Primary Examiner* — Yong Hang Jiang
(74) *Attorney, Agent, or Firm* — Boudwin Intellectual Property; Daniel Boudwin

(57) ABSTRACT

A vehicle built-in electric jack system, including a plurality of electric jacks capable of lifting a vehicle. The plurality of jacks operates using a 12-volt power supply. The plurality of jacks are telescopic jacks. Each jack is made from a plurality of cylinders. The cylinders are apportioned such that each cylinder for a jack fits inside of the previous cylinder. Each of the plurality of jacks has a minimum of one light placed on the jack. The light is directed toward the wheel well of the vehicle. The jacks and lights are attached to a controller. The controller is located inside of the vehicle such that the jacks and lights can be operated while the user is inside of the vehicle cab. Further, each jack has a rocker switch located thereon that can control the jack to which it is attached.

15 Claims, 2 Drawing Sheets

(56) References Cited

U.S. PATENT DOCUMENTS

2014/0217342 A1    8/2014   Dondurur et al.
2014/0231732 A1*   8/2014   Piuian .................. B60S 9/12
                                                      254/423

* cited by examiner

VEHICLE BUILT-IN ELECTRIC JACK SYSTEM

CROSS REFERENCE TO RELATED APPLICATIONS

This application claims the benefit of U.S. Provisional Application No. 62/714,849 filed on Aug. 6, 2018. The above identified patent application is herein incorporated by reference in its entirety to provide continuity of disclosure.

BACKGROUND OF THE INVENTION

The present invention relates to a vehicle built-in electric jack system. More particularly, the present invention provides a vehicle built-in electric jack system with lights on the cylinders.

Many people drive vehicles every day. In some unfortunate circumstances a tire may blow out on the vehicle causing the need for a tire to be changed on the side of the road. This can be extremely dangerous due to traffic. Further, this can expose a driver to weather conditions such as extreme cold, wind, rain and snow. This can make fixing a tire even more difficult. Further, if a jack is not applied properly a car can roll away or fall causing further damage or injury.

Under better circumstances a vehicle owner or mechanic may want to conduct simply repairs or change oil under the vehicle. This can require a jack or even a lift. The present day hand jacks are outdated technology and often difficult to use. This may prevent some individuals from repairing their own car or rotating their own tires.

Consequently, there is a need for an improvement in the art of raising and lowering cars. The present invention substantially diverges in design elements from the known art, and solves a problem faced by individuals with cars daily. In this regard, the present invention substantially fulfills these unmet needs.

SUMMARY OF THE INVENTION

The present invention provides a vehicle built-in electric jack system wherein the same can be utilized for providing convenience for the user when changing a tire, working under a car, or leveling a vehicle. The present system comprises a vehicle built-in electric jack system for the underside of a vehicle, including a plurality of jacks integrally attached to the underside of a vehicle. The jacks are made from a plurality of cylinders of different sizes, wherein a first cylinder will fit inside a second cylinder in a telescopic configuration. A light attached to each of the plurality of jacks. The lights encircle a top section of the cylinders. Further, a controller is located in a cab of the vehicle, to control the lights and the jacks.

Another object of the present invention is a vehicle built-in electric jack system is that the jacks are configured to only activate when the vehicle is in a safe mode.

Another object of the present invention is a vehicle built-in electric jack system wherein the jacks are electric.

Another object of the present invention is a vehicle built-in electric jack system wherein the vehicle is a manual and the safe mode is neutral and the parking brake in engaged.

Another object of the present invention is a vehicle built-in electric jack system wherein the vehicle is an automatic and the safe mode is park. Further the vehicle built-in electric jack system for the underside of a vehicle can further include a safe mode for automatic vehicles where the parking brake is engaged.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
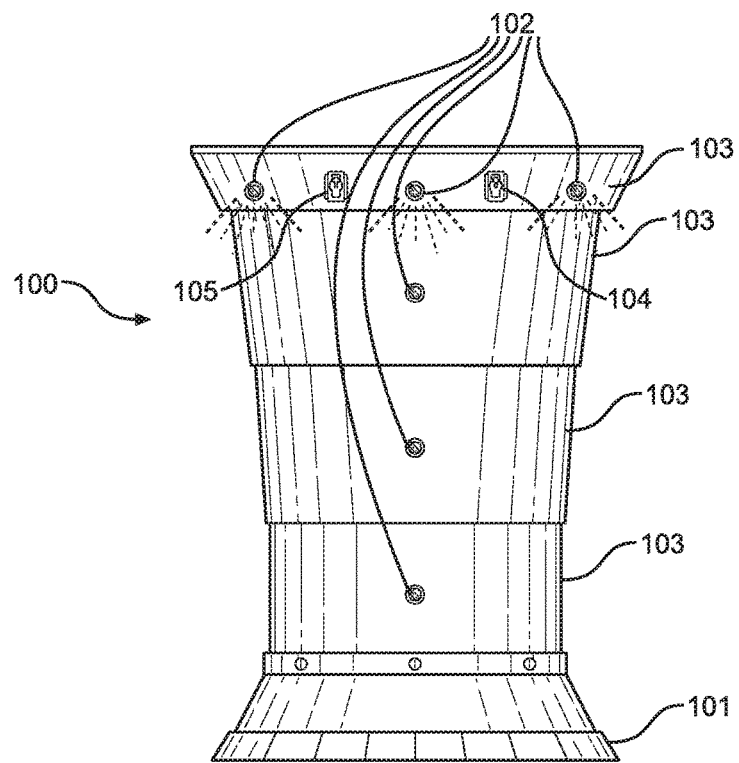
FIG. 1 shows a side view of an embodiment of a single jack where there is a foot and lights disposed on multiple cylinders.

Reference is made herein to the attached drawings. Like reference numerals are used throughout the drawings to depict like or similar elements of the vehicle built-in electric jack system. For the purposes of presenting a brief and clear description of the present invention, a preferred embodiment will be discussed as used for vehicle built-in electric jack system. The figures are intended for representative purposes only and should not be considered to be limiting in any respect.

Referring now to FIG. 1, there is shown a side view of an embodiment of a single jack 100 where there is a foot 101 and lights 102 disposed on a cylinder. In various embodiments, a plurality of jacks is attached to an underside of a vehicle. In one embodiment the jacks 100 are placed adjacent to the wheels of the vehicle. The jacks 100 may be electric telescoping jacks. Each jack 100 may include a plurality of telescoping cylinders 103. The cylinders may have a tapering configuration, wherein a diameter of an upper most cylinder progressively decreases and terminates at the lowest most cylinder.

The lower portion of the jack 100 may have a foot attached. This foot may be pivotally attached or attached via a hinge connection. The foot may be the same size as the lower most cylinder. In one embodiment the footpad 101 may be wider than the lowermost cylinder. This embodiment will provide more stability to the jack. The foot pad 101 may have an additional pad or a grooved configuration on the underside such that the jack does not slide when in contact with the ground.

In an embodiment the jacks are integrally attached to the frame of a vehicle. The jacks may be placed adjacent to the front two wheels of the vehicle. In other embodiment the jacks may be placed adjacent to all of the wheels of the vehicle. The jacks may be hooked directly into the vehicles power supply. In this embodiment the jacks should be capable of running on a 12 Volt charge or a car battery. In other embodiment the jacks may have their own power supply. In an embodiment the plurality of jacks 100 have a weather resistant rocker switch 105 attached. The rocker switch 105 is coupled to the jack such that the switch 105 can control the jack to which it is attached. In one embodiment there is a second rocker switch 104 that will allow the lights to be activated separate from the jacks.

In one embodiment there are lights disposed on each of the jacks. The lights may be disposed around the upper most cylinder. The lights may be placed around the circumference of the jacks or only facing in one direction. In one embodiment the lights shine toward an adjacent wheel well. In one embodiment the lights are powered in combination with the jack such that when the jack is activated the lights come on. In a second embodiment the lights are connected to a power source and their own control switch 104. This will allow the lights to be activated even if the jack is not.

Figure 2:
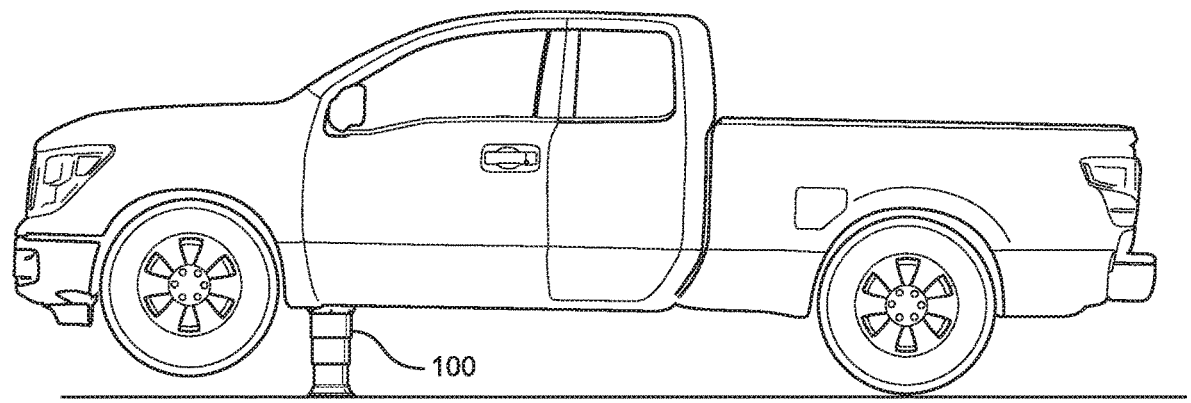
FIG. 2 shows a side view of an embodiment the jack in an extended position under a vehicle.
Figure 3:
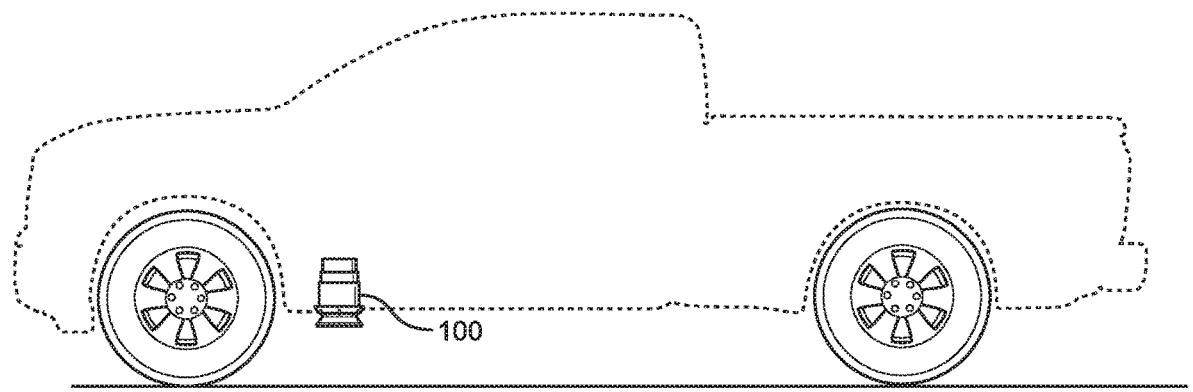
FIG. 3 shows a side view of an embodiment the jack under a vehicle in a retracted position.

Referring to FIG. 2 and FIG. 3 there are shown a side view of the jack system in an extended and a retracted position under a vehicle. The jack system can raise at least one set of wheels off the ground. There may be additional jacks that will be capable of lifting all the wheels of the vehicle off the ground. The jacks are capable of being retracted such that the vehicle can still operate normally. The jacks may be retracted into the vehicle such that only the foot pad is below the frame of the vehicle.

In one embodiment the jack is connected into a vehicles electrical system. In this embodiment the jacks may only function if the vehicle is put on park or neutral depending on the transmission type of the vehicle. In a manual vehicle the vehicle will have to be in neutral and have the parking brake engaged. In some embodiments of automatic vehicles the parking brake may be required. In one embodiment the jacks may turn on the hazard lights when activated. This added safety feature can help create a safer environment when the vehicle is being repaired on the side of the road.

Figure 4:
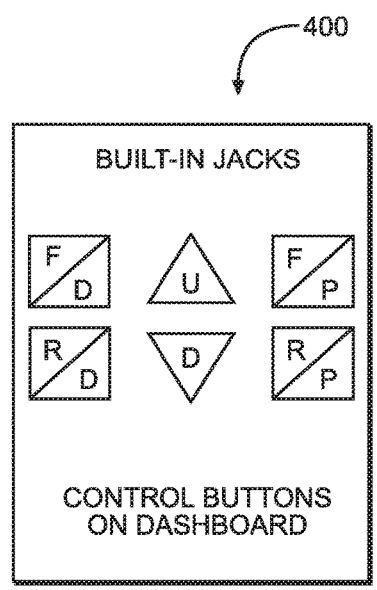
FIG. 4 shows a top view of a potential embodiment of a dash board control.

Referring to FIG. 4 there is shown a top view of an embodiment of a dash board control 400. The dash control can allow an individual to operate the jacks from inside the vehicle. The control can be wired directly into the jacks. In one embodiment the controller can be wireless. In this embodiment the controller 400 can be capable of operating the jacks from inside the of the vehicle. In another embodiment the jacks will be capable of being operated from outside of the vehicle. In one embodiment the controller will be able to control the jacks as a whole. The Letters U will correspond to UP and D will correspond to DOWN. In one embodiment the controller will allow a user to operate the jacks individually. In one controller the controller will be designated FD, RD, FP, RP. This will stand for front driver side, rear driver side, front passenger side, and rear passenger side.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle built-in electric jack system for the underside of a vehicle, comprising:
   a plurality of jacks integrally attached to the underside of a vehicle;
   the jacks comprise a plurality of cylinders of different sizes, wherein a first cylinder will fit inside a second cylinder in a telescopic configuration;
   a cylinder light attached to each cylinder of the plurality of cylinders;
   a plurality of switch lights disposed on and encircling an uppermost cylinder of the plurality of cylinders, the plurality of switch lights oriented at a non-vertical angle due to a taper of the uppermost cylinder;
   a first switch disposed on an exterior of each jack of the plurality of jacks, the first switch operably connected to each light; and
   a second switch disposed on an exterior of each jack of the plurality of the jacks, the second switch configured to operate the extension or retraction of each jack;
   wherein a switch light of the plurality of switch lights is positioned adjacent each switch, forming an arrangement of a first switch light, the first switch, a second switch light, the second switch, and a third switch light.

2. The vehicle built-in electric jack system for the underside of a vehicle of claim 1, wherein the jacks are electric.

3. The vehicle built-in electric jack system for the underside of a vehicle of claim 1, further comprising a controller operably connected to the plurality of jacks.

4. The vehicle built-in electric jack system for the underside of a vehicle of claim 3, wherein the controller is located in a cab of the vehicle.

5. The vehicle built-in electric jack system for the underside of a vehicle of claim 4, wherein the controller is wirelessly connected to the plurality of jacks.

6. The vehicle built-in electric jack system for the underside of a vehicle of claim 1, wherein the jacks are attached on an interior side and next to a wheel base.

7. A vehicle built-in electric jack system for the underside of a vehicle, comprising:
   a plurality of jacks integrally attached to the underside of a vehicle;
   the jacks comprise a plurality of cylinders of different sizes, wherein a first cylinder will fit inside a second cylinder in a telescopic configuration;
   a cylinder light attached to each cylinder of the plurality of cylinders;
   a plurality of switch lights disposed on and encircling an uppermost cylinder of the plurality of cylinders, the plurality of switch lights oriented at a non-vertical angle due to a taper of the uppermost cylinder;
   a first switch disposed on an exterior of each jack of the plurality of jacks, the first switch operably connected to each switch light and each cylinder light; and
   a second switch disposed on an exterior of each jack of the plurality of the jacks, the second switch configured to operate the extension or retraction of each jack;
   wherein one switch light of the plurality of switch lights is disposed on opposing sides of each switch, forming an arrangement of a first switch light, the first switch, a second switch light, the second switch, and a third switch light;
   wherein the jacks are operably coupled into the vehicles wiring harness; and wherein the jacks are configured to only activate when the vehicle is in a safe mode.

8. The vehicle built-in electric jack system for the underside of a vehicle of claim 7, wherein the jacks are electric.

9. The vehicle built-in electric jack system for the underside of a vehicle of claim 7, further comprising a controller operably connected to the plurality of jacks.

10. The vehicle built-in electric jack system for the underside of a vehicle of claim 9, wherein the controller is located in a cab of the vehicle.

11. The vehicle built-in electric jack system for the underside of a vehicle of claim 9, wherein the controller is wirelessly connected to the plurality of jacks.

12. The vehicle built-in electric jack system for the underside of a vehicle of claim 7, wherein the jacks are attached on an interior side and next to a wheel base.

13. The vehicle built-in electric jack system for the underside of a vehicle of claim 7, wherein the safe mode when the vehicle is a manual and is defined as the vehicle being in neutral and the parking brake in engaged.

14. The vehicle built-in electric jack system for the underside of a vehicle of claim 7, wherein the safe mode when the vehicle is an automatic is defined as the vehicle being in park.

15. The vehicle built-in electric jack system for the underside of a vehicle of claim 14, wherein the safe mode further includes the parking brake is engaged.

\* \* \* \* \*